United States Patent
Kipust

[11] Patent Number: 6,002,427
[45] Date of Patent: Dec. 14, 1999

[54] SECURITY SYSTEM WITH PROXIMITY SENSING FOR AN ELECTRONIC DEVICE

[76] Inventor: Alan J. Kipust, 41 W. 72$^{nd.}$ St., #4H, New York, N.Y. 10023

[21] Appl. No.: 08/929,479

[22] Filed: Sep. 15, 1997

[51] Int. Cl.$^6$ ..................................................... H04N 7/18
[52] U.S. Cl. ........................... 348/156; 348/634; 340/571; 340/573
[58] Field of Search ..................................... 348/633, 634, 348/77, 819, 156; 340/679, 680, 522, 875.31, 825.34, 571.39, 573, 541, 565, 825.54; 395/188; 380/4, 25; 707/1, 9; H04N 7/18

[56] References Cited

U.S. PATENT DOCUMENTS

| | | |
|---|---|---|
| 3,628,315 | 12/1971 | Bartholomew . |
| 3,736,729 | 6/1973 | Peterson . |
| 3,863,196 | 1/1975 | Hilles . |
| 4,039,853 | 8/1977 | Koizumi et al. . |
| 4,133,506 | 1/1979 | Webster .................................. 246/172 |
| 4,233,950 | 11/1980 | Krolski et al. . |
| 4,566,688 | 1/1986 | Monica . |
| 4,641,191 | 2/1987 | Sutton . |
| 4,716,469 | 12/1987 | Kim et al. . |
| 4,835,614 | 5/1989 | Ryu . |
| 5,039,038 | 8/1991 | Nichols et al. ....................... 340/825.5 |
| 5,044,472 | 9/1991 | Dammeyer et al. . |
| 5,278,654 | 1/1994 | Yang . |
| 5,406,261 | 4/1995 | Glenn ...................................... 340/540 |
| 5,453,644 | 9/1995 | Yap et al. . |
| 5,495,302 | 2/1996 | Abruna . |
| 5,505,528 | 4/1996 | Hamman et al. . |
| 5,521,652 | 5/1996 | Shalvi . |
| 5,541,580 | 7/1996 | Gerston et al. . |
| 5,541,664 | 7/1996 | Cuadrado . |
| 5,608,378 | 3/1997 | McLean et al. ........................ 340/540 |
| 5,670,940 | 9/1997 | Holcomb et al. ...................... 340/540 |
| 5,757,271 | 5/1998 | Andrews ................................ 340/571 |
| 5,835,083 | 11/1998 | Nielsen et al. ......................... 345/211 |

FOREIGN PATENT DOCUMENTS

| | | | |
|---|---|---|---|
| 2176859 | 10/1990 | Japan ........................................ 15/30 |

*Primary Examiner*—Bryan Tung
*Assistant Examiner*—Nhon T. Diep
*Attorney, Agent, or Firm*—Charles G. Call

[57] ABSTRACT

A security system includes a proximity sensor to protect against unauthorized access to an electronic device. The security system is armed upon an input from the proximity sensor indicating departure of an authorized user from the vicinity of the electronic device. The security system provides commands to the electronic device as well as other devices coupled to the electronic device to sound an alarm in event of a security violation, clear a display screen of the electronic device or take other security measures to prevent unauthorized use of or access to information contained in the electronic device. The security system can include audio and video input devices to capture and store audio and video information while the system is armed and/or while a security violation is occurring. In certain embodiments, the security system also performs usage tracking of the electronic device.

25 Claims, 12 Drawing Sheets

SECURITY SYSTEM WITH PROXIMITY SENSING FOR AN ELECTRONIC DEVICE

FIELD OF THE INVENTION

This invention relates generally to the field of electronic security systems and more particularly to the field of electronic security systems for electronic devices.

BACKGROUND OF THE INVENTION

Computers and other related electronic devices have become important tools for the creation, manipulation, transmission and storage of sensitive information. Security mechanisms to prevent unauthorized use of computers or access to the information stored therein have accordingly seen increased use. The most common way of protecting unauthorized access to a computer and the information stored therein is by use of user accounts and passwords. In such systems, use of the physical machine or access to some or all data which may be accessed by the machine is prevented if the user is unable to enter the appropriate user account name and password.

A further popular security mechanism for computers is a screen saver program. Such programs, which were originally developed to prevent "burn-in" on Cathode Ray Tubes (CRT) have evolved into security mechanisms which prevent unauthorized use of a computer. Other security programs employing passwords are also available to protect against unauthorized use of a computer. Although programs requiring entry of passwords are the most popular and inexpensive form of protection for computers, other security mechanisms such as physical locks which prevent use of the computers input/output devices have also been developed.

Typically, screen saver or password type security programs, when activated, are invoked after passage of a certain amount of time when there has been no activity by the user (i.e. no inputs via input devices such as the keyboard or mouse) with respect to the computer. When invoked, the screen saver program typically replaces the image on the computer display with a moving image selectable by the user. In addition, the amount of time required to elapse before the screen saver is invoked is typically adjustable by the user. When the user later wishes to use the computer, an input device such as a keyboard or mouse may be used to cause the generation of an input region on the display into which the user enters an authorized password (typically the account name/number is automatically filled in). If the proper password is entered, the screen saver terminates and the image displayed prior to invocation of the screen saver is regenerated on the display, allowing full access to the device.

In using a password type security program to protect against unauthorized use of a computer, a user must make a decision between security and convenience. For the highest level of security, the time interval of inactivity required for invocation of the security program must be very small. However, a very small interval is highly inconvenient as most users are not constantly entering input into the computer. If a small interval is selected, the user will have to enter an input to prevent the security program from being activated, or will have to reenter the required password every time the passage of the small selected interval of time causes invocation of the security program.

Selection of a large time interval is more convenient but allows greater opportunity for unauthorized access to the computer. Consequently, a significant security/convenience trade-off must be made in the use of a conventional password type security program. This trade-off may be acceptable in environments where the users have physically enclosed spaces such as individual offices or cubicles where unauthorized individuals are less likely to enter. The trade-off may also be acceptable in environments where it is immaterial if information on a computer screen is viewed by others. However, in certain environments security is more crucial. For example, computers located on trading floors, banks or hospitals often contain sensitive and confidential information and are located in high traffic areas used by many unauthorized individuals. In such instances, security is of much greater concern. Moreover, often times users in such environments are less likely to have the time required to actively take security measures to protect against unauthorized use of secure machines or data.

As can be seen, there exists a need for an improved security system for electronic devices such as computers to protect against unauthorized use of the machine or access to the data accessible by the machine. It would be desirable for such a security system to prevent unauthorized access yet minimize inconvenience to or involvement by the user.

SUMMARY OF THE INVENTION

The present invention advantageously provides a security system for an electronic device which involves minimal routine involvement by the user of the device to invoke the protection provided by the security system. In a principle aspect, embodiments of the present invention employ a proximity sensor to detect the presence of a user at the secured device. When the proximity sensor detects that the user has left the device, the security system is armed to prevent unauthorized use.

Embodiments employing the principles of the present invention advantageously provide security with minimal involvement by the user. Such embodiments may be used in confidential environments such as trading floors, banks or hospitals where private or high-security information may be inadvertently displayed. Devices in home environments may also benefit by limiting access to certain electronic devices by children.

In a preferred embodiment, the security system takes the form of a system which protects against unauthorized use of a personal computer. The security system includes a proximity sensor to detect the presence and/or absence of a user at the device. A controller receives the output of the proximity sensor, filters the received signal according to a sensitivity setting and transmits an appropriate signal to the personal computer to invoke certain security measures such as clearing the screen of the information being displayed, invoking a screen saver and/or ignoring input from input devices such as keyboard or pointing device.

In certain embodiments, the security system receives inputs from audio and video devices to control operation of the system or to detect unauthorized use. In such embodiments, image or voice recognition programs are used to determine whether an individual in proximity to the protected device is an authorized user. Other embodiments contain reporting functions to allow reporting of security violations to other remotely located devices, to building security systems or to security personnel. Certain embodiments make extensive use of hardware and software contained in a personal computer, such as audio and video input and output devices, network connections, modems and system and application software. Other embodiments are more self-contained to provide the necessary hardware and software to implement a security system for devices which do not already contain the required components.

These and other features and advantages of the present invention may be better understood by considering the following detailed description of a preferred embodiment of the invention. In the course of this description, reference will frequently be made to the attached drawings.

DETAILED DESCRIPTION

Figure 1:
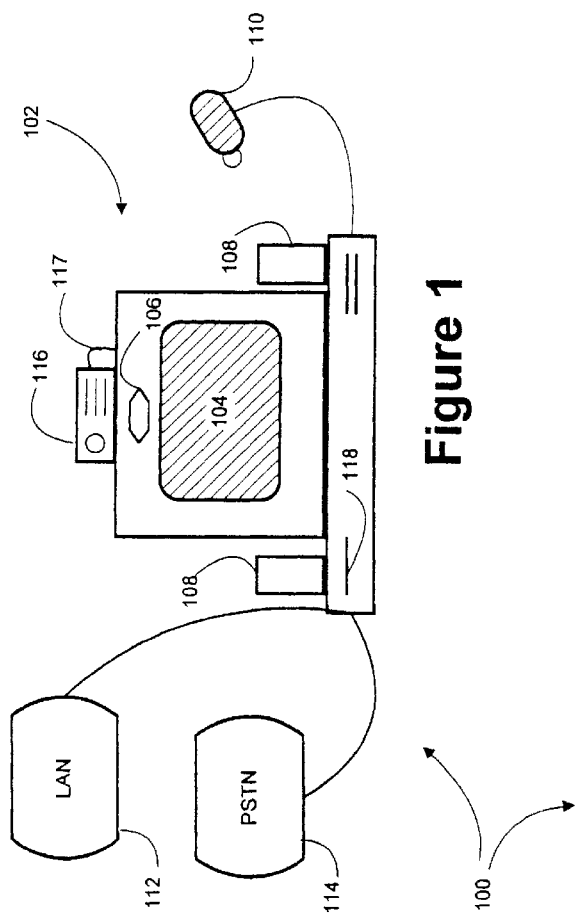
FIG. 1 of the drawings is a diagram of a electronic device in the form of a personal computer which employs the principles of the present invention.

FIG. 1 of the drawings shows an exemplary embodiment of a security system 100 which controls access to a secured device such as a personal computer (PC) 102. The PC 102 takes a conventional form and includes a microprocessor, memory, long term storage such as a hard disk drive and an operating system. The PC 102 also includes input and output devices such as a keyboard and pointing device (not shown), a visual display 104, a microphone 106 for accepting audio inputs and speakers 108 for generating audio outputs. The PC 102 may also receive video inputs from a video camera 110. The PC 102 may also be coupled to a Local Area Network (LAN) 112 by way of an appropriate network controller (not shown) and to the Public Switched Telephone Network (PSTN) 114 by way of a modem or other suitable device (not shown).

The PC 102 is merely one example of an electronic system which may embody the principles of the present invention and the foregoing elements of the PC should not be construed as being limiting in any way. Other general purpose computing devices such as workstations which contain no long term storage, for example diskless workstations, may also be used. In addition, other electronic devices which operate in response to computerized controls, contained internally or externally to the device, may be considered to constitute a "secured device" as that term is used herein.

A proximity sensor 116 detects changes in heat, movement or other physical changes indicating user departure from an established vicinity of the PC 102. Sensors for detecting such changes are well known and may respond to changes in heat, air pressure, movement by way of a variety of sensing technologies including laser, infrared or photoelectric technologies. Other sensors which detect changes in electric field may also be employed. An example of such a sensor is the Electric Field Proximity Sensor available from Russel Bik Design, San Luis Obispo, Calif.

Other types of sensors which may be used include those capable of reading or detecting an identification card carried by a user. Certain types of such sensors have the added advantage of being able to provide positive identification of the user by detecting a unique characteristic of the identification card. A variety of such identification cards are available and can be detected from different ranges. For example, proximity tokens which can be carried in a user's pocket, or cards which can be carried in a user's wallet or pocket are available from John Wainwright Systems Ltd, Bath Brewery, Bath, England.

The sensor 116 may also be a camera or microphone or physical key device used to access the computer. A sensor in the form of a camera operates in conjunction with conventional image recognition software to determine the presence of a user. A microphone operates in conjunction with audio recognition software to determine the presence of, for example, user sounds or user inputs via a keyboard, or overall user activity, such as the user's voice while speaking to others or on the telephone. The sensor 116 can also take the form of a deadman switch positioned in the chair or on the floor to detect departure from the secure vicinity near the PC 102. While the user is in position, the deadman switch responds to the pressure or weight the user creates on the sensor. When the user departs, the pressure is relieved and access to the computer is terminated.

The proximity sensor 116 transmits a proximity signal to a controller 118 which controls operation of the security system 100. The controller 118 may take the form of a card contained within the PC 102, contained in a separate housing outside of the PC 102. The controller 118 may also be implemented as software routines executed by the PC 102. The sensor 116 is physically attached (by connector 117) to the PC 102 in a manner to prevent unauthorized removal. Alternatively, the sensor 116 may be integral with the housing of the PC 102 or a peripheral to the PC such as the keyboard or pointing device. A separate sensor allows greater flexibility in the type of sensor used and in its placement. However, an integral sensor, such as in the display 104, or the housing of the PC 102 or in peripheral devices external to the PC may lead to lower manufacturing costs in high volume applications. The sensor 116 may be coupled to the controller 118 by way of a wired or wireless link. Multiple sensors may also be employed to increase sensitivity, reliability or detection range.

Figure 2:
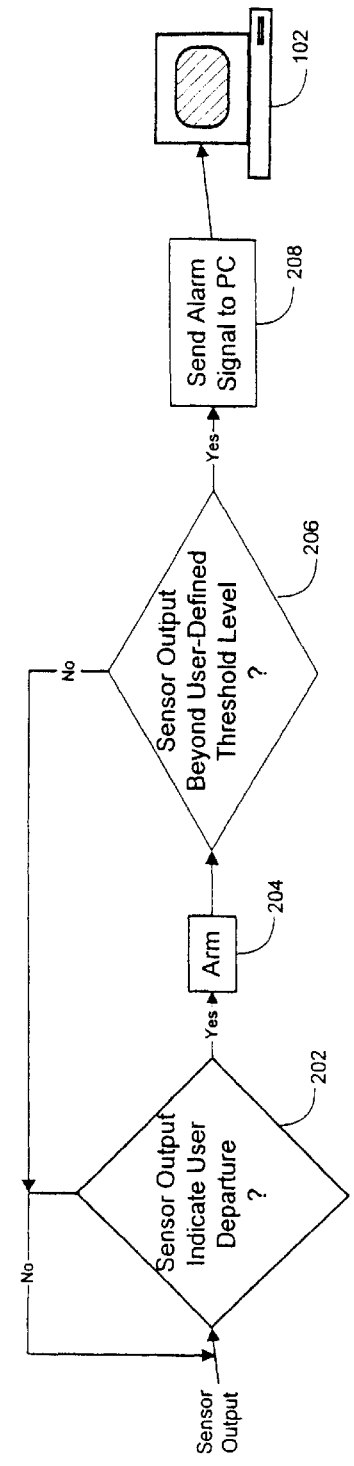
FIG. 2 is a high-level flow diagram of the operation of a preferred embodiment.

FIG. 2 of the drawings illustrates general overall operation of the controller 100. The controller receives a proximity sensor signal from the proximity sensor 116, performs appropriate analog-to-digital (A/D) conversion and filtering, to eliminate spurious signals for example, and determines (202) if the sensor output indicates departure of the user. If user departure is not indicated then no action is taken. If the sensor output indicates that the user has departed, then at 204, the security system is armed, meaning that certain security measures are undertaken to protect unauthorized access or use of the PC 102. Once the system is armed, the controller tests at 206 to determine if the sensor output is greater than a user-defined threshold or sensitivity level. If not then no action is taken. If the sensor output is greater than the user-defined threshold level then this is interpreted as an unauthorized use of the PC 102. The controller responds by sending at 208 an alarm signal to the PC 102. The alarm signal may result in occurrence of a number of different events, which are described in further detail in connection with the description of FIG. 7.

Figure 3:
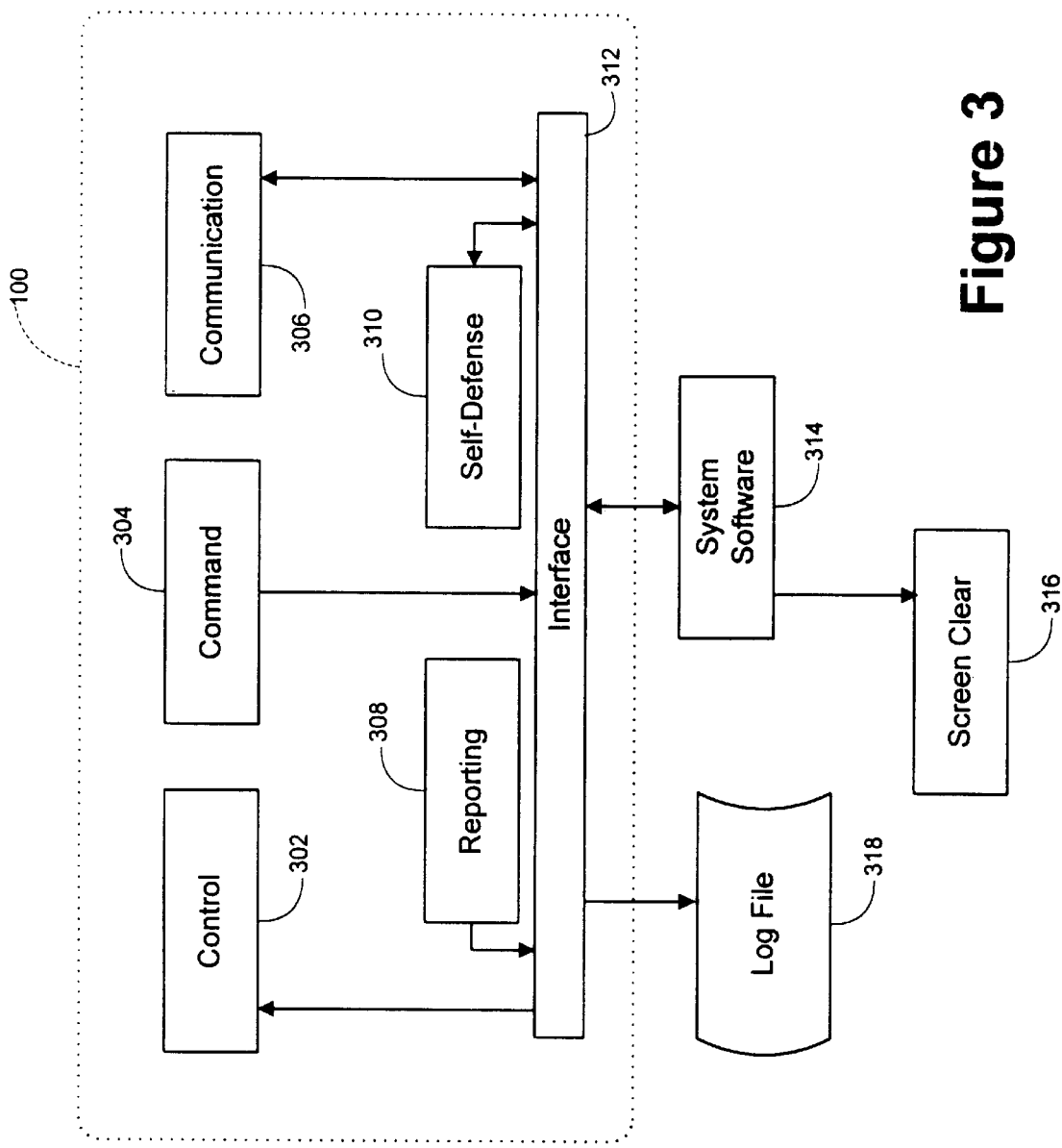
FIG. 3 is a block diagram of functional modules of a preferred embodiment.

FIG. 3 of the drawings illustrates a block diagram of the functional modules of the controller 100. The functional modules include a control module 302, a command module 304, a communication module 306, a reporting module 308, a self-defense module 310 and an interface module 312. The interface module 312 provides a common interface between the modules 302, 304, 306, 308 and 310 and components of the PC 102 such as the system software 314 of the PC 102. Specifically, the interface module 312 receives control inputs and data from the system software 312 and provides commands to system software 312 in order to use the resources of the PC 102 such as a screen clear program 316 which operates to remove potentially sensitive information from the display 104. The PC 102 may also include other commercially available resources to perform other security functions such as, for example, locking access to input or storage devices of PC 102. An example of such commercially available resources are those provided by the Norton Your Eyes Only™ program for Windows 95 available from Symantec Corporation, Cupertino, Calif.

The functional modules shown in FIG. 3 are preferably implemented as software routines executed by a conventional stored program computer such as PC 102 or by a separate controller such as explained below in connection with FIG. 4B. In an exemplary embodiment, the system software 314 is provided by the Windows 95 operating system available from Microsoft Corporation, Redmond, Wash. The screen clear program 316 is also supplied by the Windows 95 operating system which includes a screen saver program selectable by the user. The Windows 95 operating system manages system resources such as storage devices, handles input from input devices and handles writing to output devices such as displays and printers. Preferably, the functional modules shown in controller 100 make use of such services provided by Windows 95 by way of calls to the operating system which will be understood to those skilled in the art in view of the present disclosure.

The control module 302 receives inputs, by way of interface 312, to control functions such as arming and disarming of the system, and sensitivity of the proximity sensor inputs. The command module 304 provides commands to portions of the security system 100 and PC 102 to perform functions such as sounding an alarm in event of a security violation, reducing power to portions of the PC 102 when the security system is armed, clearing the screen of information when the system is armed, invoking a screen saver, disabling the PC 102, saving recent work done on the PC 102, activating a screen saver and capturing video and audio inputs while a security violation is in progress. These and other features are further explained below in connection with FIG. 7.

The communications module 306 provides status information to other machines, alarm systems or security personnel. The communications module is explained in further detail in connection with FIG. 8. The reporting module 308 stores information to log file 318 regarding events when the system is armed and when security violations are taking place. The log file 318 may be stored in a hard disk drive of the PC 102. Alternatively, the log file 318 may also be stored in a controller card in an implementation such as set forth in FIG. 4B. The reporting module is explained in further detail below in connection with FIG. 9. The self-defense module 310 monitors integrity of the security system 100 while the system is armed. If any aspect of the system is compromised without proper authorization, the self-defense module causes audible and visual alarms to be activated. The self-defense module is explained in further detail below in connection with FIG. 10.

Figure 4B:
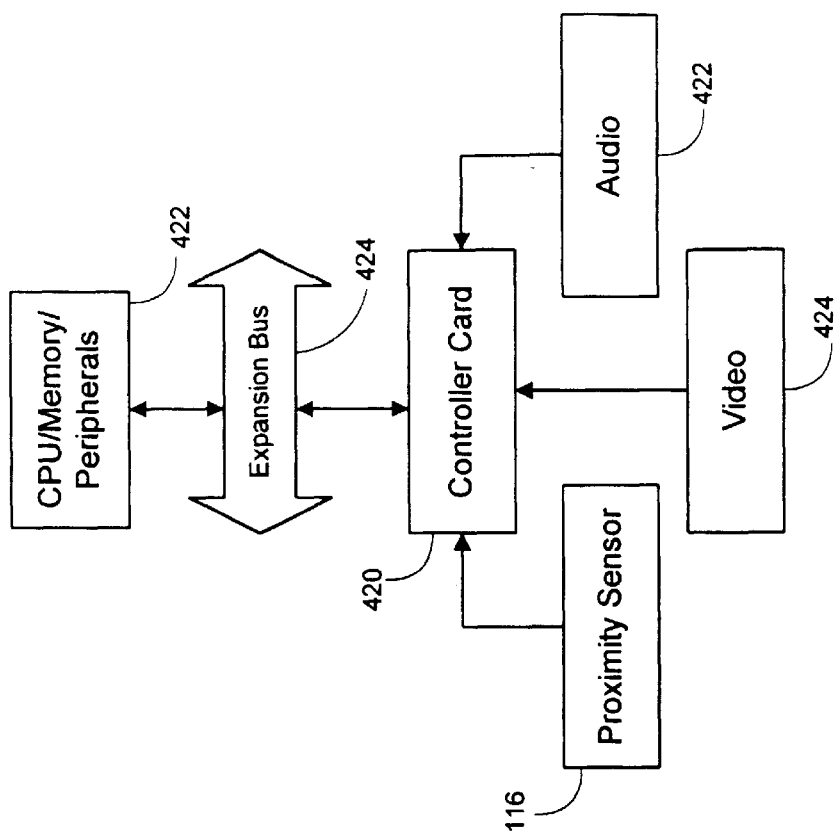
FIGS. 4A and 4B are alternative embodiments of hardware organizations of a personal computer as shown in FIG. 1 which employs the principles of the present invention.
Figure 4A:
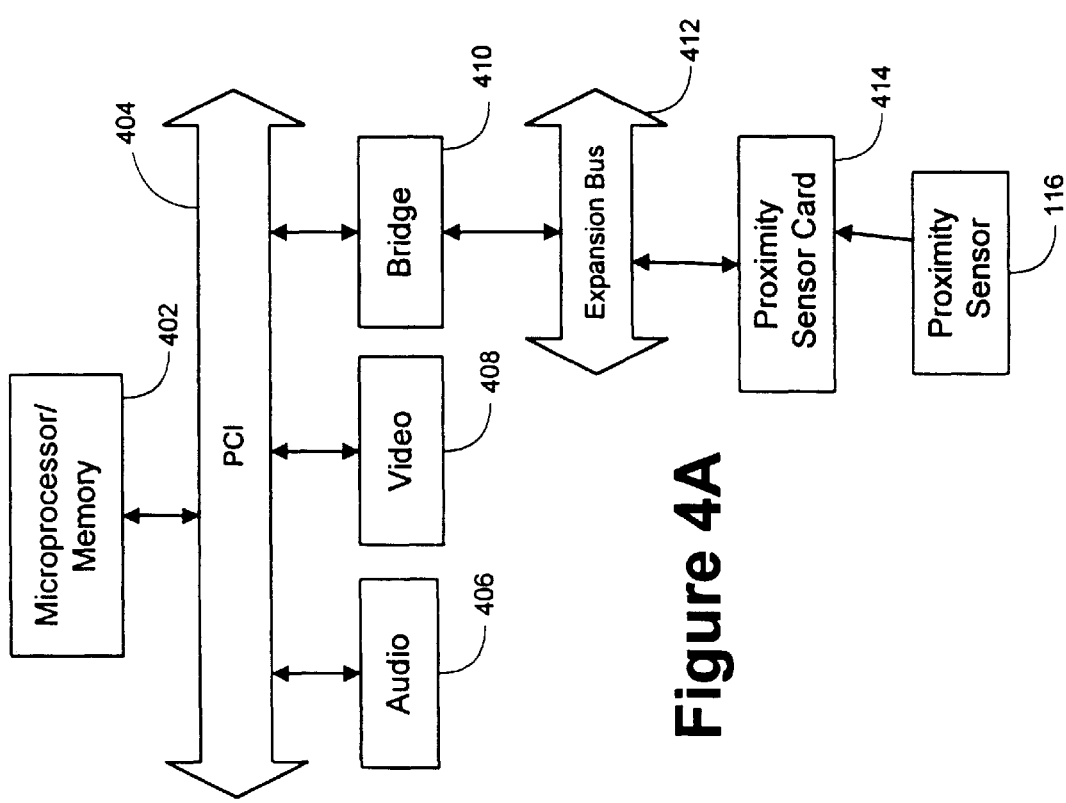

FIGS. 4A and 4B show alternative embodiments of implementations of the controller 100 for use in PC 102. In FIG. 4A, the controller 100 is implemented by extensive use of components and functions supplied with many personal computers. A personal computer in the embodiment of FIG. 4A has contained therewith components commonly found in modern computers, including, a microprocessor and memory 402 coupled to a standard bus such as the PCI (Peripheral Components Interconnect) bus 404. Also coupled to the bus 404 are audio and video controllers 406 and 408 to implement audio and video input and output. A bridge 410 couples the components on the bus 404 to components on a conventional expansion bus 412. The expansion bus 412 has coupled thereto a proximity sensor card 414 which receives inputs generated by proximity sensor 116. The proximity sensor 116 and card 414 may be eliminated if the proximity sensor takes the form of a video camera or microphone with appropriate recognition software. In such an instance, the audio and video components 406 and 408 would provide the necessary hardware.

FIG. 4B shows an alternative configuration of the controller 100 in which the hardware necessary to implement the controller is contained on a separate controller card 420. Such an embodiment is preferable for computers which do not have the hardware necessary to implement all of the functions required for the security system 100. For example older computers may not have the sophisticated audio and video input and output systems available in many newer computers. In such an instance, the embodiment of FIG. 4B may be preferable, as it contains on a single card the connections and components necessary to add the functions to the PC 102 to implement the security system 100. As seen in FIG. 4B, the PC 102 includes the necessary CPU, memory and peripherals 422 and an expansion bus 424. Controller card 420 is coupled to the expansion bus 424 to communicate with the PC. The controller card 420 contains a microcontroller, random-access memory (RAM) for short term storage, long term program storage memory such as a Read-Only Memory (ROM) and input-output circuitry to accept inputs from a proximity sensor 116, and audio inputs from an audio input device 422 and video inputs from a video input device 424. The controller card 420 may also contain long term memory to store the log file 318. Such memory may take the form of memory which is fed by a battery power supply or an alternative form of memory not requiring electrical power for storage of data, such as an Electrically Erasable Programmable Read Only Memory (EEPROM).

Alternatively, the embodiment of FIG. 4B may be implemented on a card contained in a housing external to the PC 102. Such a card would be coupled to the PC 102 via a port of the PC 102. The controller card 420 and the sensor 116, and audio and video modules 422 and 424 shown in FIG. 4B are well suited to a PC 102 which does not have the audio and video hardware and software necessary to implement desired audio and video functions of the security system 100. However, the controller card 420, sensor 116, and audio and video modules 422 and 424 may also be used in a PC 102 having a configuration such as shown in FIG. 4A. FIGS. 4A and 4B show two examples of how a controller 100 may be implemented for systems which have different hardware configurations. The hardware organizations shown in FIGS. 4A and 4B should not be construed as limiting in any way. The exact implementation of the functional modules shown in FIG. 3 is not critical. Variations in the hardware organizations shown in FIGS. 4A and 4B are well within the principles of the present invention. For example the hardware organizations shown in FIGS. 4A and 4B can be expected to change as ever more functions are integrated onto a single chip such as integration of certain or all of the audio and video functions together with the microprocessor. Other changes include, but are not limited to, the interconnection of the various components within the PC 102 by way of different bus structures.

Figure 5:
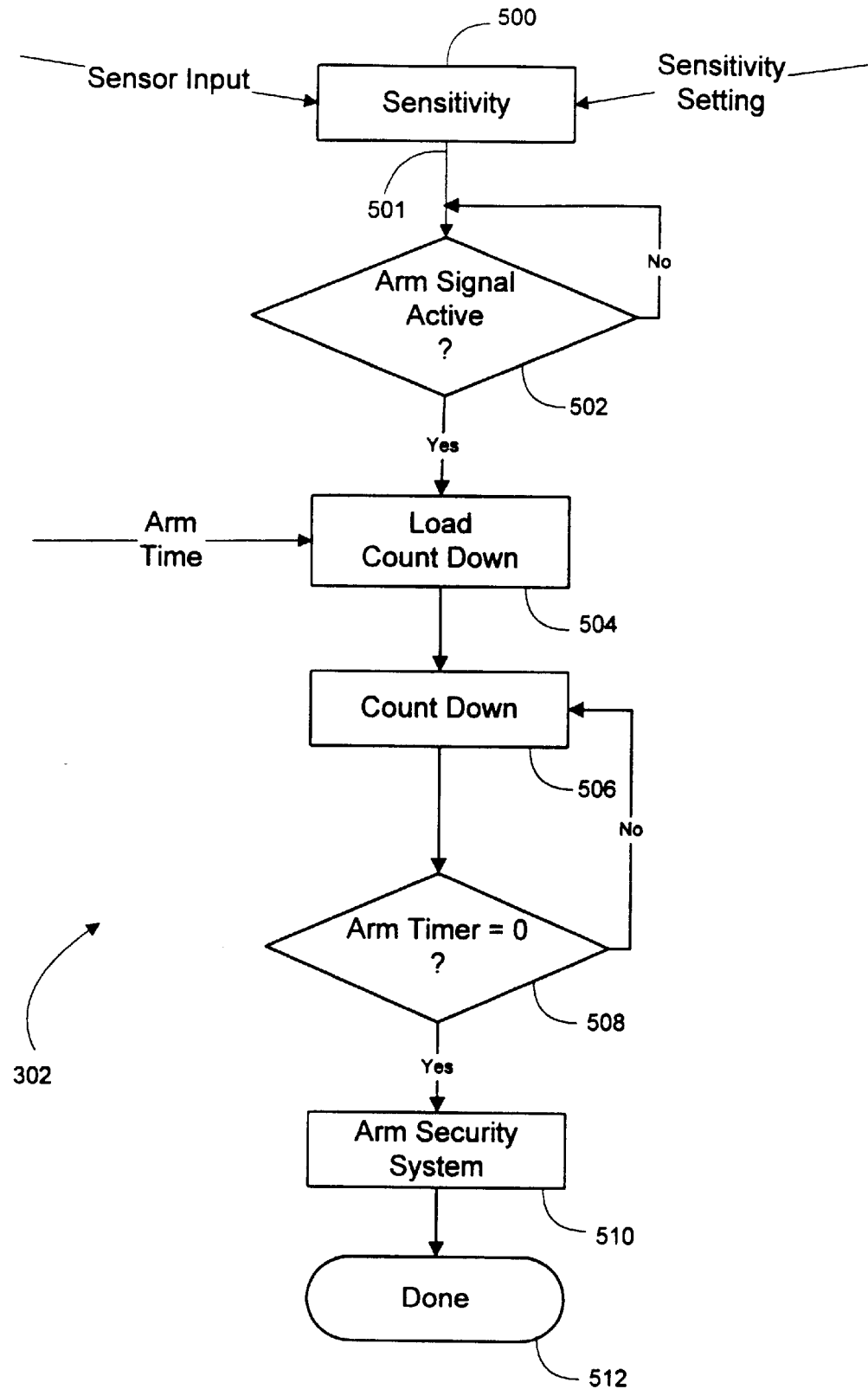
FIGS. 5 and 6 are functional block diagrams showing operation of features of the control module of FIG. 3.
Figure 6:
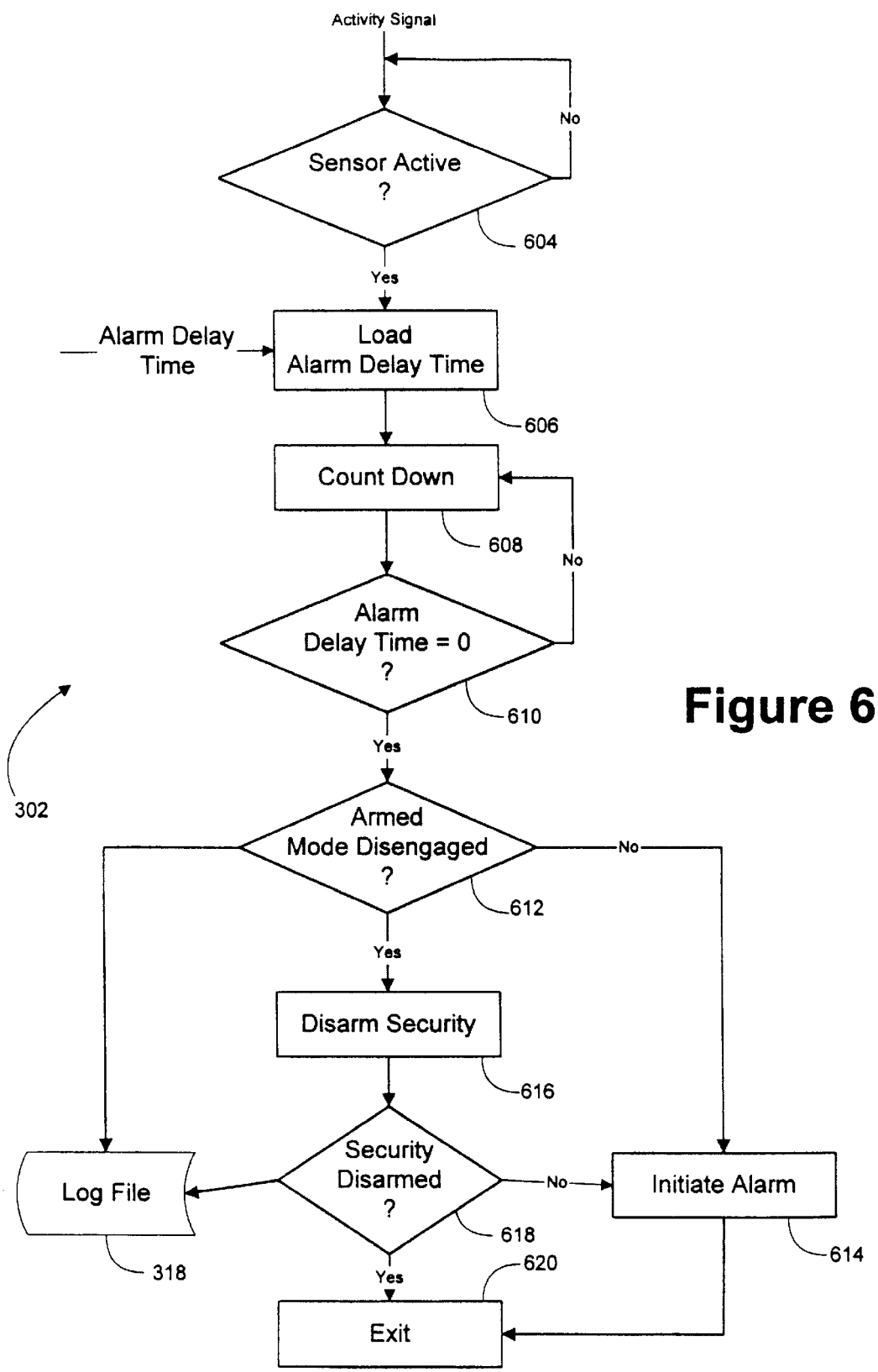

FIGS. 5 and 6 are flow diagrams showing operation of the control module 302. FIG. 5 shows the sequence of steps performed in arming the security system 100 to detect unauthorized use of the PC 102. The steps in FIG. 5 illustrate in further detail the arm function shown at 204 in FIG. 2. The controller 118 waits a pre-programmed amount of time before arming itself upon detection by the proximity sensor that the user has departed the work area. The user may occasionally walk away from the secured device for only seconds and there is no need to arm the security system. The user may set the most appropriate amount of time away from the computer that constitutes a true and permanent departure from the work area. This feature also allows the user to take into account the security needs for a particular machine. Thus, stricter security measures will require a smaller pre-programmed amount of time.

Turning to FIG. 5, at 500 a signal generated by the proximity sensor 116, which has been digitized and filtered as necessary, is received and compared against a sensitivity setting to generate an activity signal 501. The sensitivity setting is selected by the user to adjust the sensitivity or range of the proximity sensor. Thus the vicinity in which an unauthorized intrusion is detected can be varied depending upon the security needs and environment of the secured device 102. If the sensor signal received by sensitivity block 500 exceeds the sensitivity setting then the arm signal is generated to indicate that the user has departed the vicinity of the secured device. If the activity signal 501 indicates continuing activity in the vicinity of the secured device then no action is taken. If the activity signal indicates that activity has ceased then at steps 504, 506 and 508 a count down procedure is performed to wait a pre-programmed amount of time before arming the security system. At step 504 a count down value is loaded with an arm time value, which is selected by the user. The controller then repeats steps 506 and 508 until the arm timer value has counted down to zero at which point at step 510 the security system is armed, and the arm routine is exited at step 512.

Figure 13:
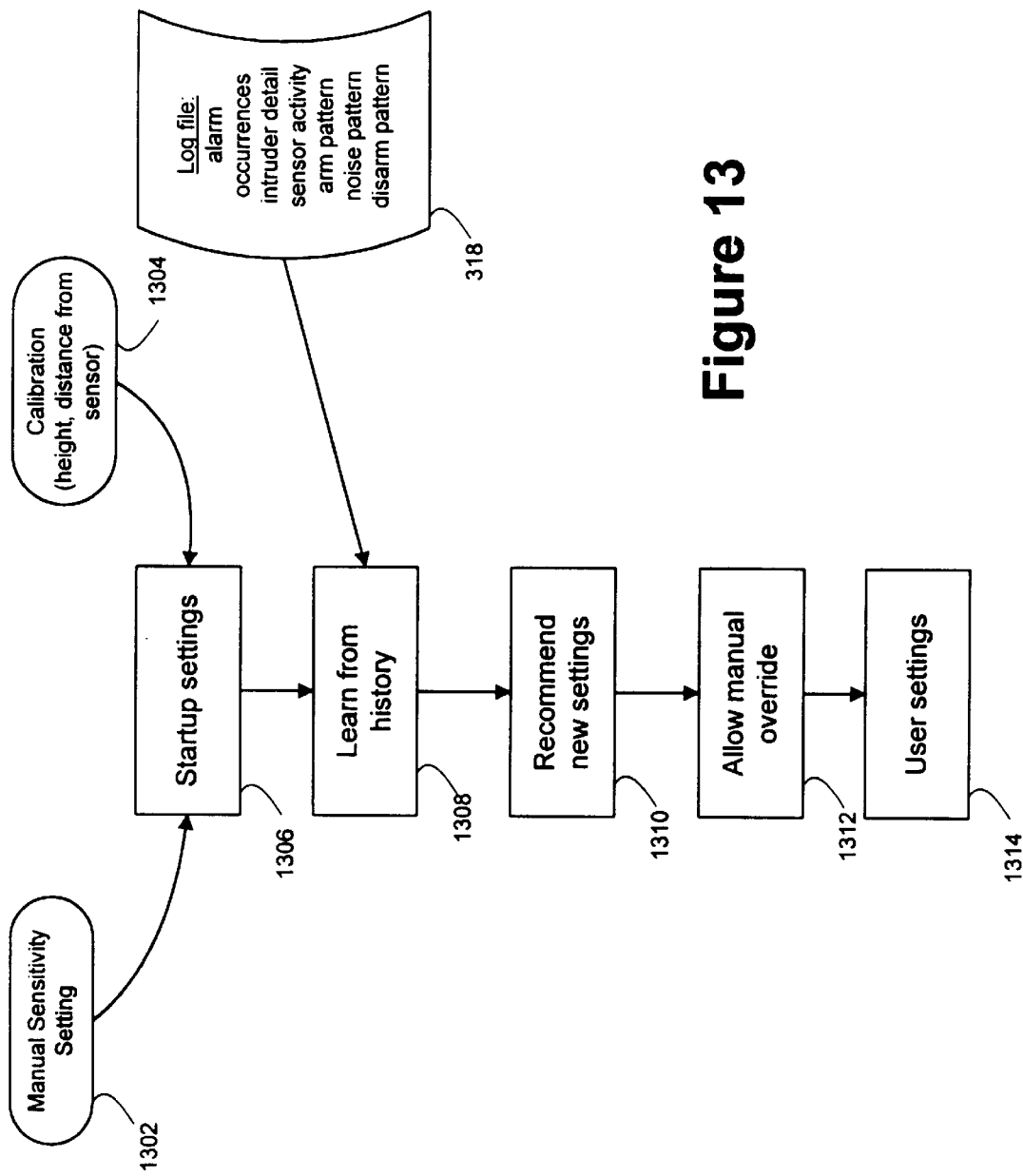
FIG. 13 is a flow diagram showing operation of a dynamic sensitivity module of a preferred embodiment.

The level or type of signal required to generate the activity signal 501 can advantageously be dynamically changed to account for differing levels of activity at different times of the day or different days of the week. For example, the activity signal 501 may be generated in response to a sensor input at a certain time of the day, say for example at nighttime, but not be generated in response to exactly the same signal at a different time of day, for example business hours in an office where the level of activity around the secured device is greater. FIG. 13 shows a flow diagram of operation of an embodiment of a dynamic sensitivity routine which performs such a function. Initially, a plurality of settings such as a manual sensitivity setting 1302 for the sensor 116 are used to generate startup settings 1306 for the system. Depending upon the type or types of sensor(s) used, calibration settings 1304 necessary for such sensors may also be used as inputs. The startup settings 1306 art then modified at 1308 in response to a variety of sensed information and new settings (1310) are then recommended. These settings can then be accepted or overridden (1312) to generate final settings 1314. The modification, or learning, of the settings at 1308 is advantageously performed in response to information stored in log file 318. Depending upon the configuration of the system 100, the log file 318 can contain a wealth of information including the time and type of alarm occurrences, details as to any intruders such as video or audio information, the frequency and type of sensor activity, for instance the intensity of the signal generated by the sensor, the frequency and duration of arming of the system 100, the patterns background noise detected by any sensors, and the frequency and duration of disarming the system 100. Preferably such information is stored together with time and date information to enable a determination of particular times during the day and what days during the week in which particular activity occurs.

Figures 14A, 14B:
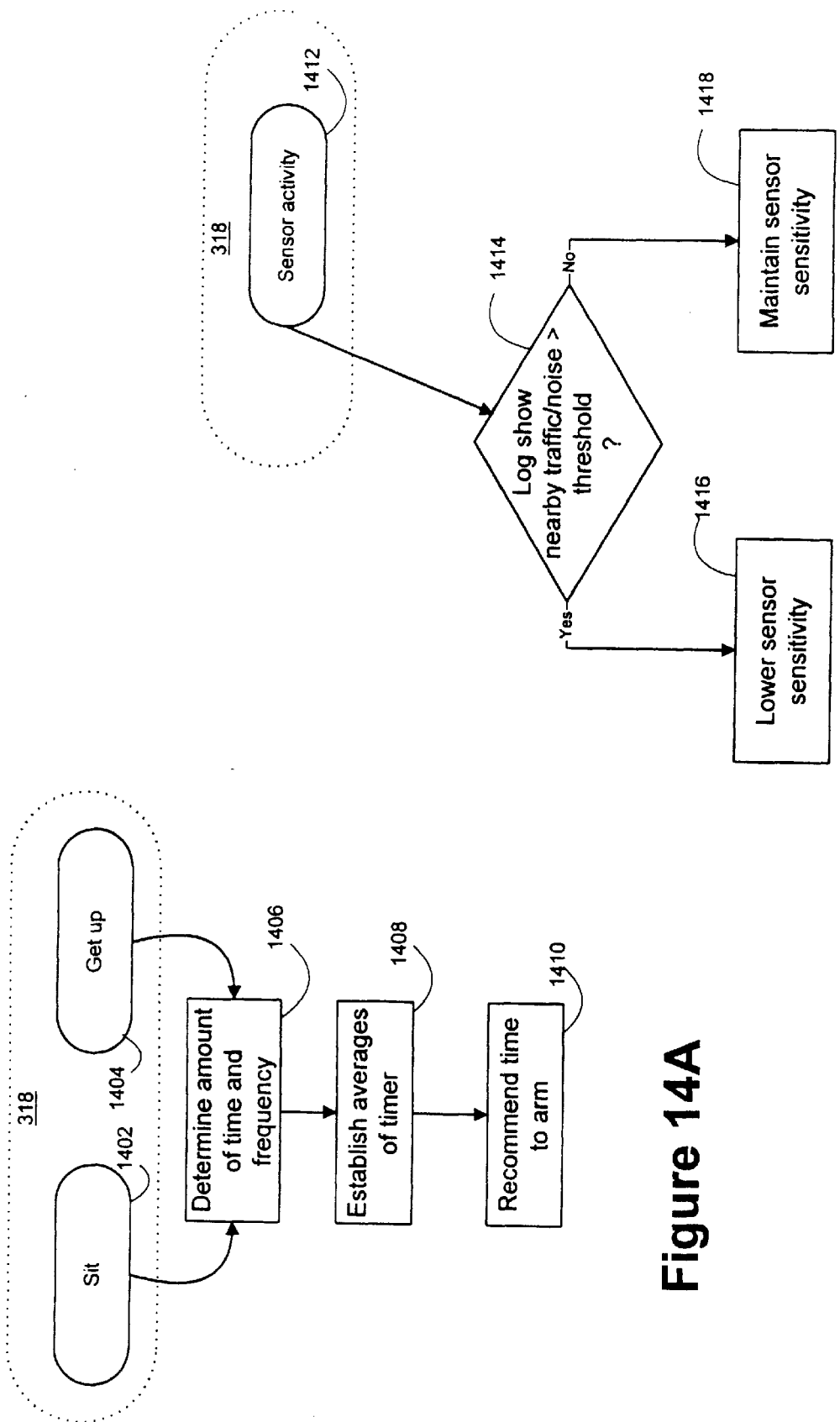
FIGS. 14A and 14B are flow diagrams showing in greater detail portions of the flow diagram of FIG. 13.

FIGS. 14A and 14B show two examples of the operation of learning block 1308. In FIG. 14A, a determination is made at 1406 of how often and for how long a user is sitting at the secured device based upon information stored in log file 318. For purposes of clarity, this information is shown as being stored specifically in the form of information denoting when the user sits or gets up from the secured device. However, it should be understood that the information in the log file 318 may be stored in a number of formats and is likely to be stored in the form of raw data from sensors which has been digitized and filtered and time and date stamped. In such a case, such data is retrieved from the log file 318 and a determination is made from such data as to when the user was seated at the secured device, when the user got up to leave the vicinity of the secured device and when the user returned to the vicinity of the secured device. Once the frequency and amount of time for being seated at the secured device and being away from the secured device is determined, an average of such data is made and based upon such average, a new time required to elapse before the system is armed upon departure of the user from vicinity of the secured device is recommended. Other values providing an indication such as moving averages, mean time at the secured device or the like may be used as an alternative to using an average value.

FIG. 14B shows an example of determination of a sensor sensitivity setting based upon sensor activity, such as proximity sensor 116. At 1414, sensor activity data 1412 stored in log file 318 is retrieved and analyzed to determine if the data shows noise or traffic in the vicinity of the secured device to be greater than a user adjustable threshold. Such analysis can be performed in a variety of ways. For example, an average of the sensor data can be taken, or a weighted average, with certain times of day, or certain types of sensor readings, being weighted differently than others. Other useful figures may include a median value of the readings or other like statistical quantities. If the traffic or noise in the vicinity of the secured device is found to be greater than the threshold then the sensitivity setting can be lowered to increase the sensitivity of the sensor. If the traffic or noise in the vicinity of the secured device is found to be less than the threshold then the sensitivity can be maintained.

FIG. 6 shows the sequence of steps performed in disarming the security system 100. The user will need a few seconds to disarm the security system upon returning to the secured device. The security system advantageously allows an alarm delay time to be entered to control the amount of time allowed to disarm the system. Ideally a minimal amount of time will be programmed to allow the user to disarm the system. This will leave the secured device exposed for the shortest amount of time should an intruder attempt to disarm the system. In FIG. 6 at 604, the activity signal 501 is received and a test is performed to determine if the sensor has detected an authorized or unauthorized user in the work area. If no activity is detected then no action is taken. Otherwise if activity in the vicinity of the secured device is detected then at step 606 the alarm delay time value, selected in advance by the user, is loaded and at steps 608 and 610 a count down procedure is performed to allow the alarm delay time to elapse. Once the alarm delay time has elapsed, at 612, a test is performed to determine if a proper attempt to disarm the system has been performed. By way of example, the system may be disarmed by entry of a password, or by pressing a predetermined sequence of keys on the keyboard or moving the pointing device in a particular manner. If a proper attempt to disarm the system has not been performed at the expiration of the alarm delay time, then at 614 an alarm mode is initiated. Otherwise, if a proper attempt at disarming the system has been made then at 616 an attempt is made to disarm the security system. It is possible that the security system is not disarmed after step 616, for example because of failure of certain components. Thus at step 618 a test is performed to determine if the security system has actually been disarmed. If so, then the routine is exited at step 620. If not, then the alarm is initiated at step 614. The result of the test at step 618 is saved to the log file 318.

Figure 7:
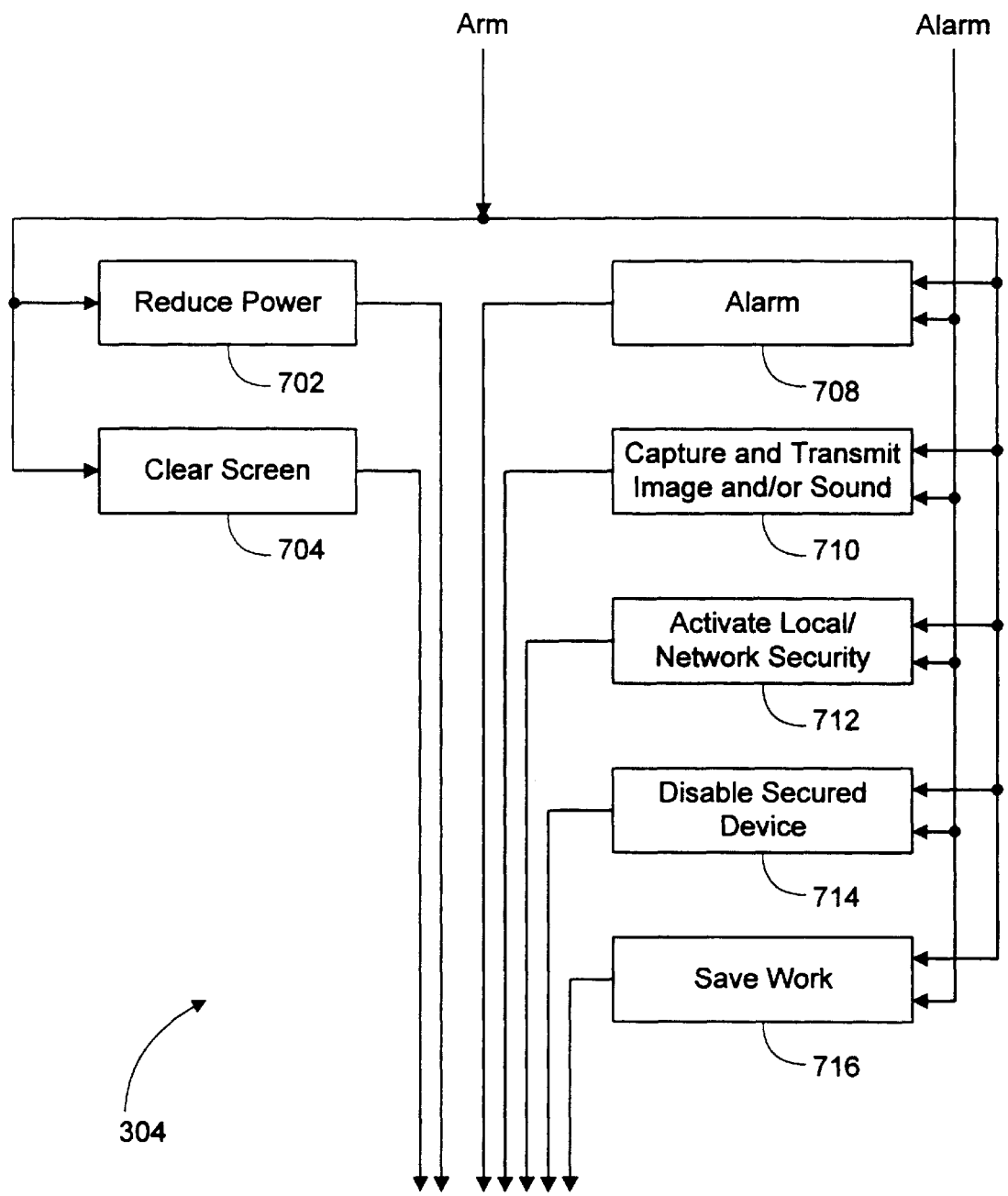
FIG. 7 is a functional block diagram showing greater details of the command module of FIG. 3.

FIG. 7 shows the commands implemented by the command module 304. The command module 304 responds to an arm signal, such as generated by block 510 in FIG. 5, indicating that the system is being armed, and the alarm signal, such as generated by block 614 in FIG. 6. Modules 702 and 704 respond to the arm signal, module 708 responds to the alarm signal and modules 710, 712, 714 and 716 respond to the arm signal and the alarm signal. The functions performed by the modules shown in FIG. 7 are preferably selectable in advance to customize the security system for a particular environment.

Module 702, upon arming of the system, causes a low power command to be issued to place the secured device in a low power mode. If the secured device takes the form of a personal computer then a number of options are selectable. For instance, the monitor can be dimmed or turned off, the processor speed can be decreased, the hard disc drive can be turned off or slowed, or the read/write head can be placed in the park position. Such power reduction modes are common in many personal computers and such modes can be activated under control of the power control module 702.

Module 704 causes the screen of the secured device to be cleared to remove any secure information which may have been on the screen when the system was armed. This can be performed very simply by replacing the image on the screen with a new, predetermined image. The manner is which information is removed from the screen is selectable. Other options for removing information from the screen include closing any windows which may be open to display the background or desktop image found in graphical user interfaces or invoking a screen saver or other similar type of application program stored in the PC 102 or downloaded from another machine such as a server in response to a request by the PC. Screen savers are standard in many personal computers and several are typically supplied with the Windows 95 operating system which is generally installed on new personal computers. Module 704, if activated, causes invocation of a pre-selected program such as a screen saver when the system is armed. Other programs which cause removal of information from the screen are also commercially available and, if installed, can be selected to be invoked by the module 704.

Alarm module 708 responds to the alarm signal by causing an alarm to be activated. The type, number or level(s) of alarm(s) activated will differ depending upon the configuration selected for the system. For example, an alarm configuration for the system can include a simple bell, siren or other type of audible alarm, or voice recording, indicating a security violation. The alarm can also take the form of a visual indication such as a flashing light or can be a combination of audible and visible indications. Another alarm configuration includes different alarms for different types of security violations. For example a first type of visible alarm, or low level audible alarm can be activated in response to a minor security violation and a loud audible alarm can be activated in response to a security violation considered to be more serious.

Module 710 responds to arming of the security system by capturing audio and/or video information in the vicinity of the secured device. The captured information is digitized and stored in a conventional format in an appropriate storage device. In addition, the information can be transmitted live to a remote device for live viewing or listening. Video information can also be displayed on the display 104. This feature allows anyone in the vicinity of the secured device 102 to be informed that a video recording is being made of their activity around the secured device. Module 710 can be selected for operation only when a security violation has occurred. In such a case, audio and/or video information is recorded only in response to the alarm signal, i.e. when a security violation has occurred.

Module 712 responds to arming of the security system by transmitting a command to cause activation of security measures to network 112 or to cause activation of other building security measures. Network security measures include increased security measures such as limiting access to certain files or directories of files in the file system to the system administrator or a limited number of authorized users. Other security measures include duplication of certain files or directories of files to preselected storage devices.

Module 714 disables the secured device 102 to prevent or limit further use. For example, the display 104 can be powered down or disabled, the input devices can ignore any further inputs until entry of a predetermined set of inputs or resetting of the secured device, or long term storage devices can be prevented from further modification of any data stored therein. Alternatively, the entire secured device can be powered down to prevent further operation. Some or all of the foregoing operations can be performed in response to the arm signal or the alarm signal.

Module 716 causes any data stored in temporary storage areas of the secured device to be stored to an appropriate file and causes any open files to be closed. Such files may be stored in long term storage devices in the secured device or to files stored elsewhere in network 112. Module 716 operates in response to the arm signal or the alarm signal.

Figure 8:
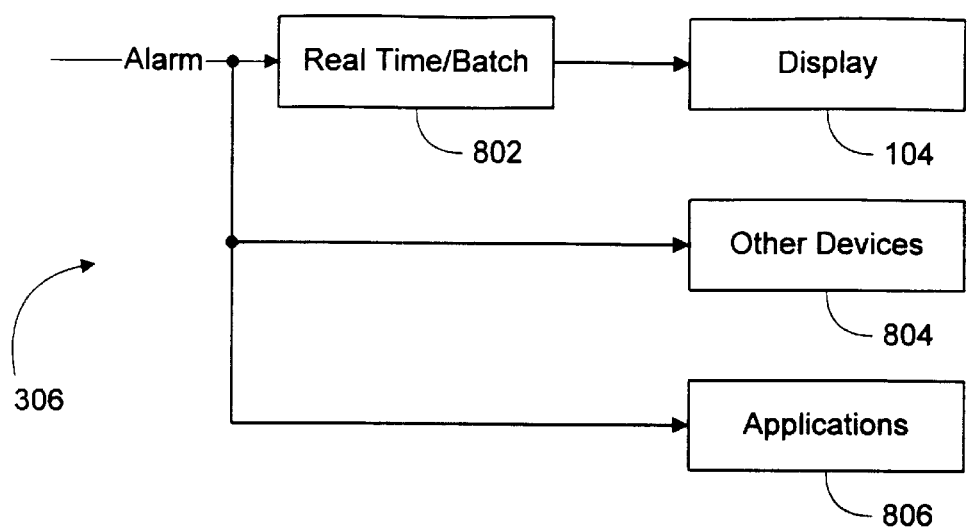
FIG. 8 is a functional block diagram showing further details of the communications module of FIG. 3.

FIG. 8 shows details of operation of the communication module 306. In response to the alarm signal, the communication module transmits information regarding intrusion to the display 104 of the PC 102, to other devices 804 coupled to the PC 102, and also to other applications 806 currently being executed by the PC 102. The information transmitted by way of transmission module 802 is selectable by the user or system administrator and can be transmitted in real time or in batch mode at selectable intervals. The other devices 804 include a system administrator terminal, all other computers proximate to the PC 102 or selected machines remote from the PC 102. The information sent to other applications 806 is in the form of a command to save the data in files opened by the application and/or to exit the application.

Figure 9:
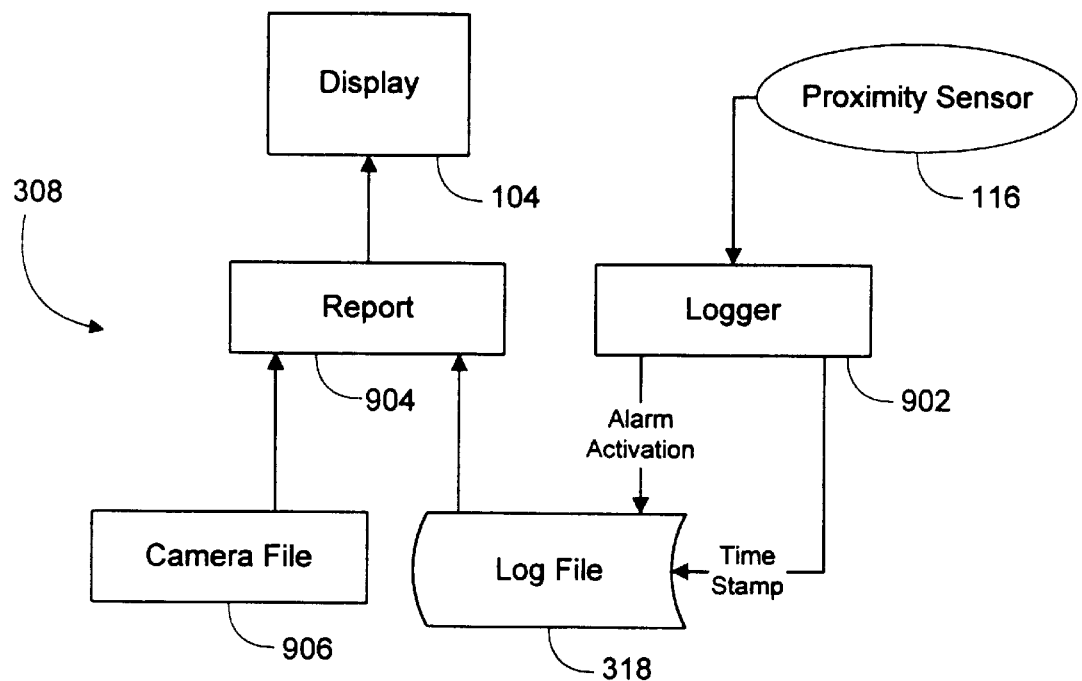
FIG. 9 is a functional block diagram showing further details of the reporting module of FIG. 3.

FIG. 9 shows details of operation of the reporting module 308. The reporting module 308 performs a logging function and a reporting function. The logging function is implemented by way of a logger 902 which receives a value indicative of the signal transmitted by the proximity sensor 116, generates a time stamp and stores the information to log file 318. The logger also stores the occurrence of an alarm to the log file together with a time stamp.

Report module 904 retrieves information from the log file 318 and generates a report for display on display 104. If a camera is coupled to the PC 102 to generate video type data for a camera file 906, the report module 904 contains the functionality necessary to cause retrieval and display of the data contained in the camera file 906.

Figure 10:
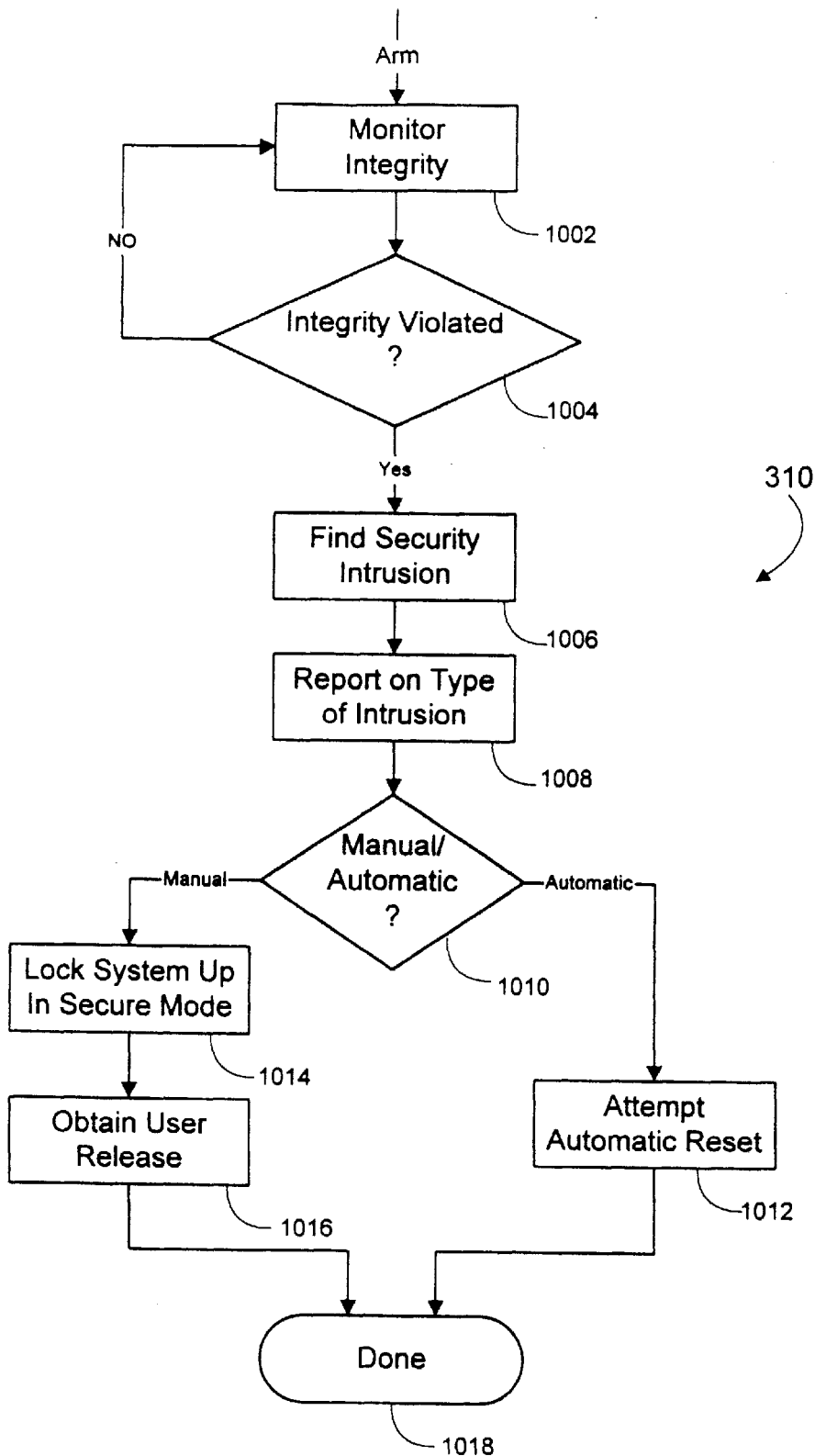
FIG. 10 is a flow diagram showing further details of the self-defense module of FIG. 3.

FIG. 10 shows further details of the operation of self-defense module 310. The self-defense module responds to the arm signal by performing periodic integrity monitoring, steps 1002 and 1004, of the system. This may be performed by performing checks of the input/output devices to ensure they are properly connected to the PC 102. Monitoring of the input devices may also be performed to determine if access to the PC 102 has been attempted. For example, any use of the input devices can be construed as a security intrusion. A legitimate attempt to disarm the system is handled in a manner described in connection with FIG. 6. Specifically, step 1004 can contain a delay time, such as shown at steps 606 and 608 in FIG. 6, to ignore inputs which result in disarming of the system. If integrity of the system is determined to have been violated, then at 1006 the source or sources of the security intrusion is/are identified and at 1008 and the source or sources is/are reported at step 1008 in a manner described above in connection with FIG. 8. At steps 1010, 1012, 1014 and 1016 a manual or automatic reset of the system is performed depending upon the type of reset selected. If an automatic reset of the system has been selected, then at step 1012, an automatic reset of the system is attempted. If a manual reset has been selected, then at step 1014, the system is locked so that no further use may be made. For instance, all inputs can be ignored until the system is properly disarmed at step 1016.

Figure 11:
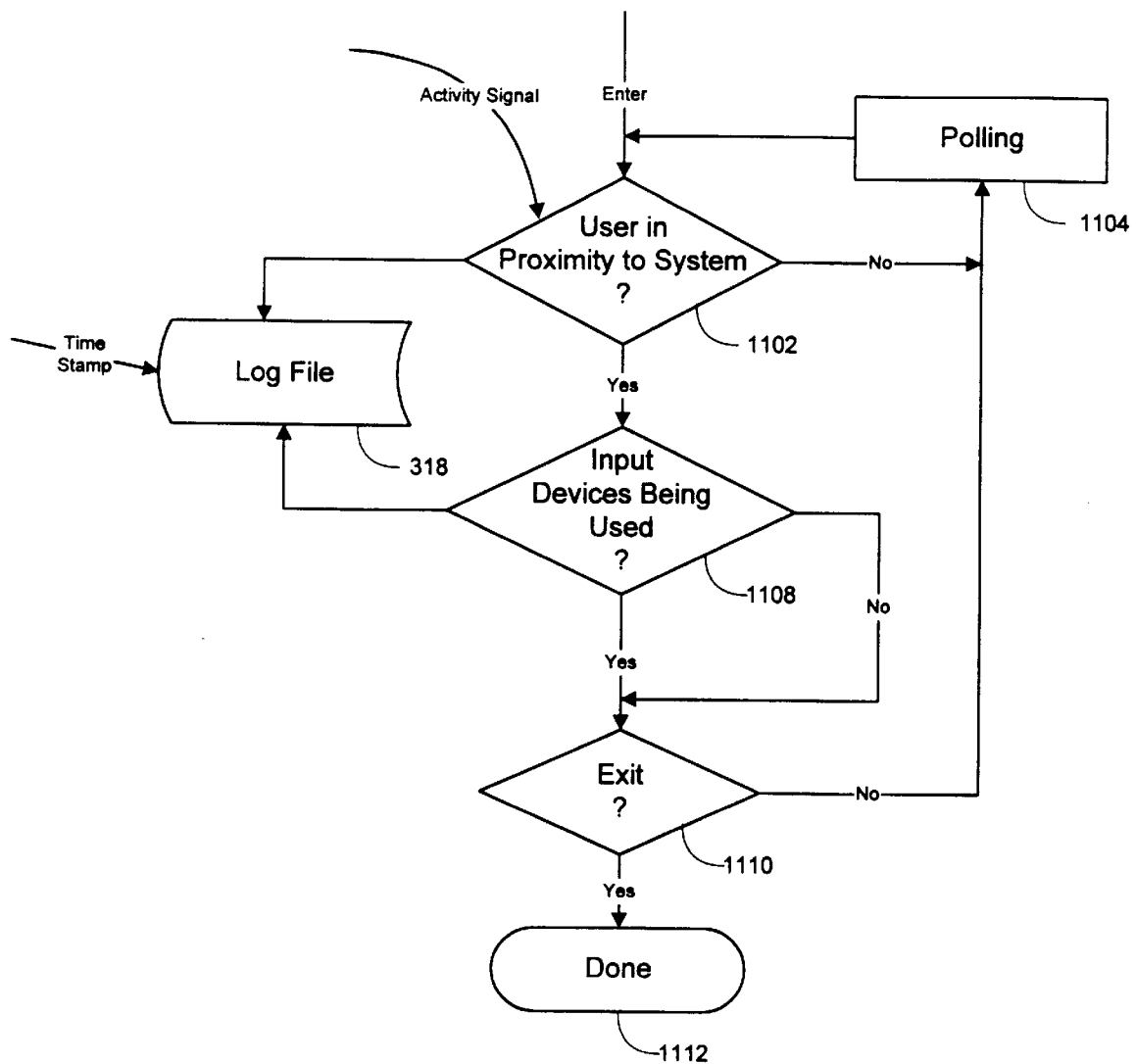
FIGS. 11 and 12 are flow diagrams showing operation of additional applications of the principles of the present invention.
Figure 12:
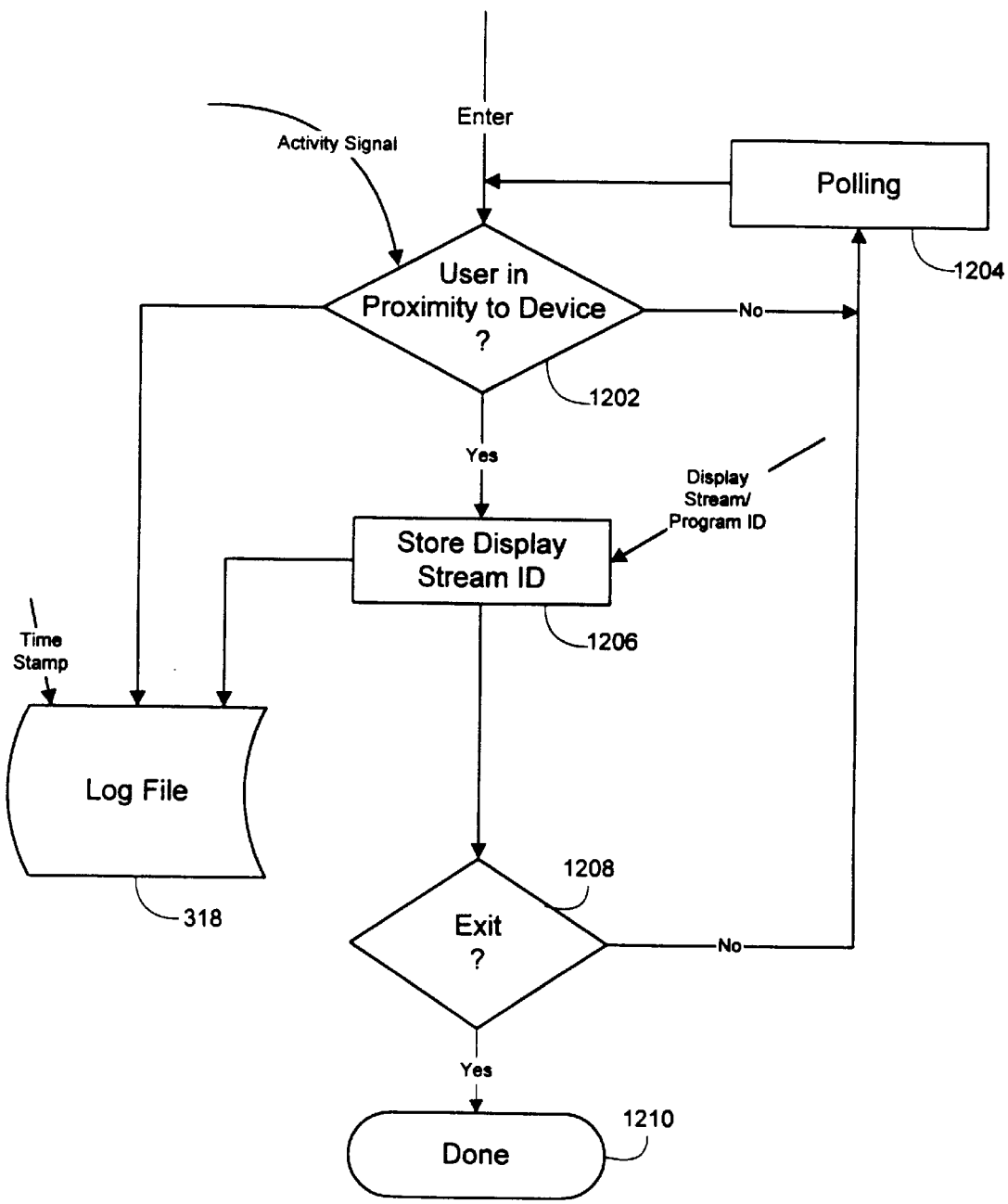

FIGS. 11 and 12 show additional applications of the security system 100. FIG. 11 shows an implementation in which the security system 100 is used to monitor usage of a computer based on timed utilization of the computer and proximity to the computer while not operating the computer. Such an implementation is particularly useful in environments where computers are rented such as at commercial copy shops, or in hotel or airport office facilities used by business travelers. Additional uses include data gathering to determine the usage pattern of a machine.

In FIG. 11, the system loops between steps 1102 and 1104 periodically checking if the proximity sensor has detected activity in the vicinity of the secured device. If a user is detected to be in proximity to the secured device then at step 1108 a test is performed to determine if any input devices are being used. The result of the test is stored to the log file 318, which also receives a time stamp to be stored with the information received from step 1108. Next, a test is performed at 1110 to determine if the routine should be exited. This occurs, for example, in response to an input received, for example, from a system administrator, or upon expiration of a predetermined period of time. If no exit command has been received, then the routine returns to step 1104, otherwise the routine is exited.

FIG. 12 shows an application in which the security system 100 is used to track usage of a secured device by monitoring the content of material being viewed on the secured device. For example, the content of programs being viewed on a television, or on a computer used as a television. Such an embodiment finds particular use to perform tracking of popularity of certain programs. For example, a television coupled to a system employing the principles of the present invention can be monitored to determine the video programs being viewed. In addition, a computer such as PC 102 can be monitored to determine the frequency of use of the computer programs executed by the PC. Alternatively, the content of information being downloaded to the PC 102 from remote sites such as from the Internet or from commercial databases can be monitored. In addition to tracking the content of material being viewed on the secured device, the identity or category of viewer can also be tracked. For example, if the PC 102 is appropriately configured with a camera and appropriate image recognition software then the identity or type of individual in proximity to the secured device can be determined. For example, comparisons can be made against a database to determine either the precise identity of the detected individual or the visual characteristics of the individual such as adult/child or male/female based on certain visual characteristics such as height and overall size of the individual, manner of dress, accessories and the like.

In FIG. 12, a polling loop similar to that shown in FIG. 11 is executed at steps 1202 and 1204 to determine if a user is in proximity to the secured device in response to inputs received from the proximity sensor 116 as filtered by sensitivity module 602. If a user is not in the vicinity of the secured device then that information is stored in the log file 318, together with a time stamp indicating at which time the information is being stored, and the routine continues the polling and testing steps of 1204 and 1202. If a user is determined to be in the vicinity of the secured device at step 1202 then that information is stored to log file 318, together with the time stamp, and at step 1206, information identifying the video program being displayed or computer program being used is stored to the log file 318, together with the time stamp. In the case of a video program, the information stored to the log file is preferably an identification code, referred to herein as a display stream ID, which is transmitted with the video program. In the case of an executable computer program, the identification code stored to the log file is preferably a registry code or identifier, such as used to identify application programs by the operating system. In the case of the programs or data downloaded from remote sites, such as from the Internet or commercial databases, the information stored to the log file can be a Universal Resource Locator (URL) such as used to identify the source of information on the World Wide Web (WEB) or other similar type identification type information.

At step 1208 a test is performed if an exit command has been received to exit the routine. Such a command may be received from the secured device itself by way of a command entered via an input device, from a remotely located system operator or from a timer indicating either a particular predetermined time at which the routine should be terminated or expiration of a predetermined amount of time.

It is to be understood that the specific mechanisms and techniques, discussed herein are merely illustrative of exemplary applications of the principles of the invention. Numerous modifications may be made to the methods and apparatus described without departing from the true spirit and scope of the invention.

What is claimed is:

1. A controller for a security system which protects against unauthorized use of an electronic device comprising:
   a control unit which receives a proximity input indicative of proximity of an individual to said electronic device, said control unit comprising,
      arming means, responsive to said proximity input and to a timer input, for arming said security system a first changeable amount of time after said proximity input indicates cessation of activity at said electronic device; and
      disarming means, responsive to said proximity input and to said timer input, for engaging an alarm, when said security system is armed, a second changeable amount of time after said proximity input indicates activity at said electronic device, if said security system is not disarmed within said second changeable amount of time; and
   a command unit which causes removal of information from a visual display of said electronic device upon arming of said security system.

2. A controller as set forth in claim 1 wherein said removal of information from said visual display is removed in a manner selectable by an authorized user of said electronic device.

3. A controller as set forth in claim 1 wherein said proximity input is generated by a movement type sensor which detects movement.

4. A controller as set forth in claim 1 wherein said proximity input is generated by an image recognition program which receives a video input from a camera positioned to record visual images of a predetermined area around said electronic device, said image recognition program generating said proximity input upon detection of an unauthorized user attempting use of said device.

5. A controller as set forth in claim 1 wherein said control unit further comprises a voice recognition module which recognizes audio inputs generated by an authorized user of said device to control operation of said device.

6. A controller as set forth in claim 1 wherein said control unit further comprises a sensitivity module which responds to authorized user inputs to control sensitivity of sensors coupled to said security system.

7. A controller as set forth in claim 1 wherein said control unit further comprises a networking module which controls communications between said security system and remote devices.

8. A controller as set forth in claim 1 wherein said control unit further comprises a remote control module which receives commands from an authorized operator at a remote device to control operation of said security system.

9. A controller as set forth in claim 1 wherein said command unit further responds to arming of said security system by causing said electronic device to enter a power reduction mode.

10. A controller as set forth in claim 1 wherein said command unit responds to unauthorized use of said electronic device by capturing video information regarding said unauthorized use.

11. A controller as set forth in claim 1 wherein said command unit responds to unauthorized use of said electronic device by further capturing audio information regarding said unauthorized use.

12. A controller as set forth in claim 1 wherein said command unit causes removal of information from said visual display by invoking a resident security application.

13. A controller as set forth in claim 12 wherein said resident security application is a screen saver program.

14. A controller as set forth in claim 12 wherein said resident security application is stored externally to said device and is transmitted to said device upon receipt of a request from said device.

15. A controller as set forth in claim 1 wherein said command unit responds to unauthorized use of said electronic device by causing transmission over a local area type network of a signal indicating said unauthorized use.

16. A controller as set forth in claim 1 wherein said command unit responds to unauthorized use of said electronic device by causing input devices coupled to said electronic device to be disabled from accepting all inputs other than an authorized input.

17. A controller as set forth in claim 1 wherein said command unit responds to unauthorized use of said electronic device by causing data stored in said electronic device to be duplicated to a different storage device.

18. A controller as set forth in claim 1 further comprising a communication module which causes status information to be transmitted to a remote device.

19. A controller as set forth in claim 1 further comprising a reporting module which causes proximity information, indicative of information received from said proximity input, to be stored to a log file.

20. A controller as set forth in claim 19 wherein the reporting module further stores time stamp information to said log file.

21. A controller as set forth in claim 20 wherein the reporting module further stores information regarding the contents of said display when said system is armed.

22. A controller as set forth in claim 21 wherein the reporting module further stores information regarding the input received by input devices coupled to said electronic device in response to activation of said alarm and which stores information transmitted by said electronic device to output devices coupled to said electronic device.

23. A controller as set forth in claim 22 further comprising a dynamic response module which changes response of said control unit to said proximity input as a function of said information stored in said log file.

24. A proximity sensing system which senses activity in the vicinity of a computerized device, comprising:
   an activity detector which responds to an activity signal, indicative of activity in the vicinity of the computerized device, by storing information indicative of said activity to a log file; and
   an input device detector, responsive to said activity detector, which stores information indicative of inputs entered into said computerized device to said log file.

25. A usage tracking system for a computerized electronic device which includes an output device for outputting user viewable information, the usage tracking system comprising:
   a proximity detector which responds to an activity signal indicative of activity in the vicinity of said computerized electronic device by storing information indicative of said activity signal to a log file; and
   a content detector, responsive to said proximity detector, which stores information indicative of said user viewable information being outputted by said output device to said log file.

* * * * *